(12) United States Patent
Wong et al.

(10) Patent No.: US 7,644,413 B2
(45) Date of Patent: *Jan. 5, 2010

(54) USER MODE DEVICE DRIVER INTERFACE

(75) Inventors: Gilman K. Wong, Redmond, WA (US);
Lingyun Wang, Redmond, WA (US);
Hock S. Lee, Redmond, WA (US); Kirk O. Olynyk, Redmond, WA (US); David Liping Xu, Redmond, WA (US); James Andrew Alan Goossen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 438 days.

This patent is subject to a terminal disclaimer.

(21) Appl. No.: 10/850,717

(22) Filed: May 21, 2004

(65) Prior Publication Data

US 2004/0216145 A1 Oct. 28, 2004

Related U.S. Application Data

(63) Continuation of application No. 09/211,941, filed on Dec. 15, 1998, now Pat. No. 6,871,350.

(51) Int. Cl.
*G06F 9/00* (2006.01)
*G06F 9/54* (2006.01)

(52) U.S. Cl. ...................... 719/323; 719/321
(58) Field of Classification Search ........... 719/321, 719/323

See application file for complete search history.

(56) References Cited

U.S. PATENT DOCUMENTS

| 5,745,762 | A | | 4/1998 | Celi et al. |
| 5,774,720 | A | | 6/1998 | Borgendale et al. |
| 5,867,710 | A | | 2/1999 | Dorris et al. |
| 5,926,775 | A | * | 7/1999 | Brumley et al. ............. 702/127 |
| 6,131,163 | A | * | 10/2000 | Wiegel ........................ 726/12 |
| 6,148,438 | A | * | 11/2000 | Schmit ....................... 717/137 |
| 6,157,959 | A | * | 12/2000 | Bonham et al. ............. 719/313 |
| 6,212,574 | B1 | * | 4/2001 | O'Rourke et al. ........... 719/321 |

FOREIGN PATENT DOCUMENTS

WO WO 99/39254 8/1999

OTHER PUBLICATIONS

Tracey, Camp et al. "Microkernels: A Submodule for a Traditional Operating Systems Course" Mar. 1995 pp. 154-158.

(Continued)

*Primary Examiner*—Hyung S Sough
*Assistant Examiner*—Abdou K Seye
(74) *Attorney, Agent, or Firm*—Woodcock Washburn LLP

(57) ABSTRACT

A user mode device driver interface (UMDDI) is disclosed. The UMDDI is preferably implemented in Windows® NT® version 5.0 and similar systems. The UMDDI allows a device driver to execute in user-mode while the graphics engine (GRE) remains in kernel-mode. The UMDDI exists as a layer between the user-mode driver and GRE; from the perspective of GRE, it encapsulates the user-mode driver and makes it appear to be a normal kernel-mode driver. The UMDDI layer handles the kernel-to-user and user-to-kernel transitions, parameter validation, and management of the kernel-mode and user-mode data and objects.

7 Claims, 4 Drawing Sheets

OTHER PUBLICATIONS

Erich, Gamma et.al. "Design Patterns" 1994 Addison Wesley pp. 207-217.

Hunt, Galen C., "Creating User-Mode Device Drivers with a Proxy", USENIX Windows NT Workshop, Aug. 11-13, 1999, pp. 5-59.

* cited by examiner

USER MODE DEVICE DRIVER INTERFACE

RELATED APPLICATION

This application is a continuation of U.S. patent application Ser. No. 09/211,941, filed Dec. 15, 1998, and is incorporated herein by reference.

COPYRIGHT NOTICE AND PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 1998 Microsoft Corporation.

TECHNICAL FIELD OF THE INVENTION

The present invention pertains generally to device drivers, and more particularly to method and apparatus for hosting device drivers in user-mode.

BACKGROUND OF THE INVENTION

Prior to Windows® NT® version 4.0, the Win32 subsystem used a client-server architecture in which the Graphics Engine (GRE) or core, including the graphics device drivers, executed in a user-mode process (the "server process") that was distinct from the user-mode application process (the "client process"). For performance reasons, Windows® NT® version 4.0 and subsequent releases switched to a kernel-mode architecture in which the GRE executed entirely in kernel-mode. This change required that the graphics device drivers also execute in kernel-mode. Execution in this mode, however, has a number of inherent restrictions and limitations.

For example, the kernel-mode stack space is limited. In Windows® NT® versions 4.0 and 5.0, the limit is 8 Kbytes. Moreover, the driver may not use native floating-point operations (i.e., float or double data type) on an x86 processor machine. Another limitation is that the driver does not have access to the entire set of Win32 APIs; it is limited to a subset of system services provided by the kernel-mode Win32 subsystem. Additionally, the driver may not call other user-mode components or drivers.

There are problems with system stability as well. An error in the driver may crash the entire operating system (i.e., put the system into an irrecoverable error state that requires the user to reinitialize the computer system). If the driver does not properly manage its resources, it can lose track of and deplete the operating system's resources. For example, if the driver does not free kernel memory allocations after they are no longer needed, the operating system will eventually run out of available memory and halt the system.

SUMMARY OF THE INVENTION

As described more fully below, various embodiments of the invention provide methods, systems and machine readable articles allowing for communication between a graphics engine executing in a kernel mode and a device driver executable in a user mode, wherein from the perspective of the graphics engine the user mode device driver appears as if it were a kernel mode driver.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
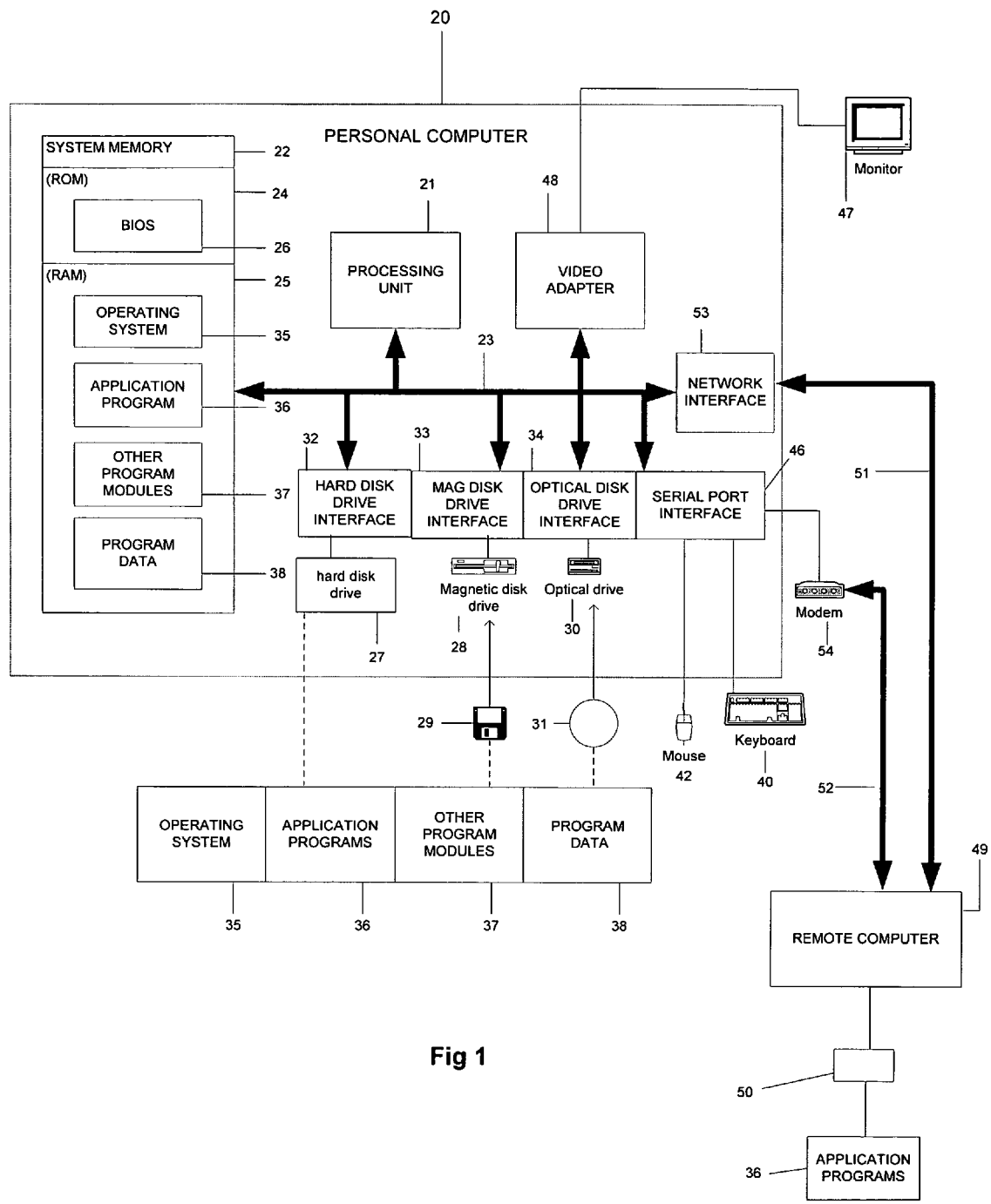
FIG. 1 illustrates a simplified overview of an example embodiment of the present invention.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer, the invention is not so limited.

The system bus 23 may be any of several types of bus structures including a, memory bus or memory controller, a peripheral bus, and a local bus using any of a variety of bus architectures. The system memory may also be referred to as simply the 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored or encoded in a machine readable medium such as the hard disk, magnetic disk 29, optical disk 31, ROM 24, RAM 25, or an electrical signal such as an electronic data stream through a communications channel, including an operating system 35, one or more application programs 36, other program modules 37, and program data 38. As described below in more detail, operating system 35 may allocate memory such as RAM 25 into kernel-mode memory or user-mode memory. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, an embedded computer or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

EXAMPLE EMBODIMENTS OF THE INVENTION

Figure 2:
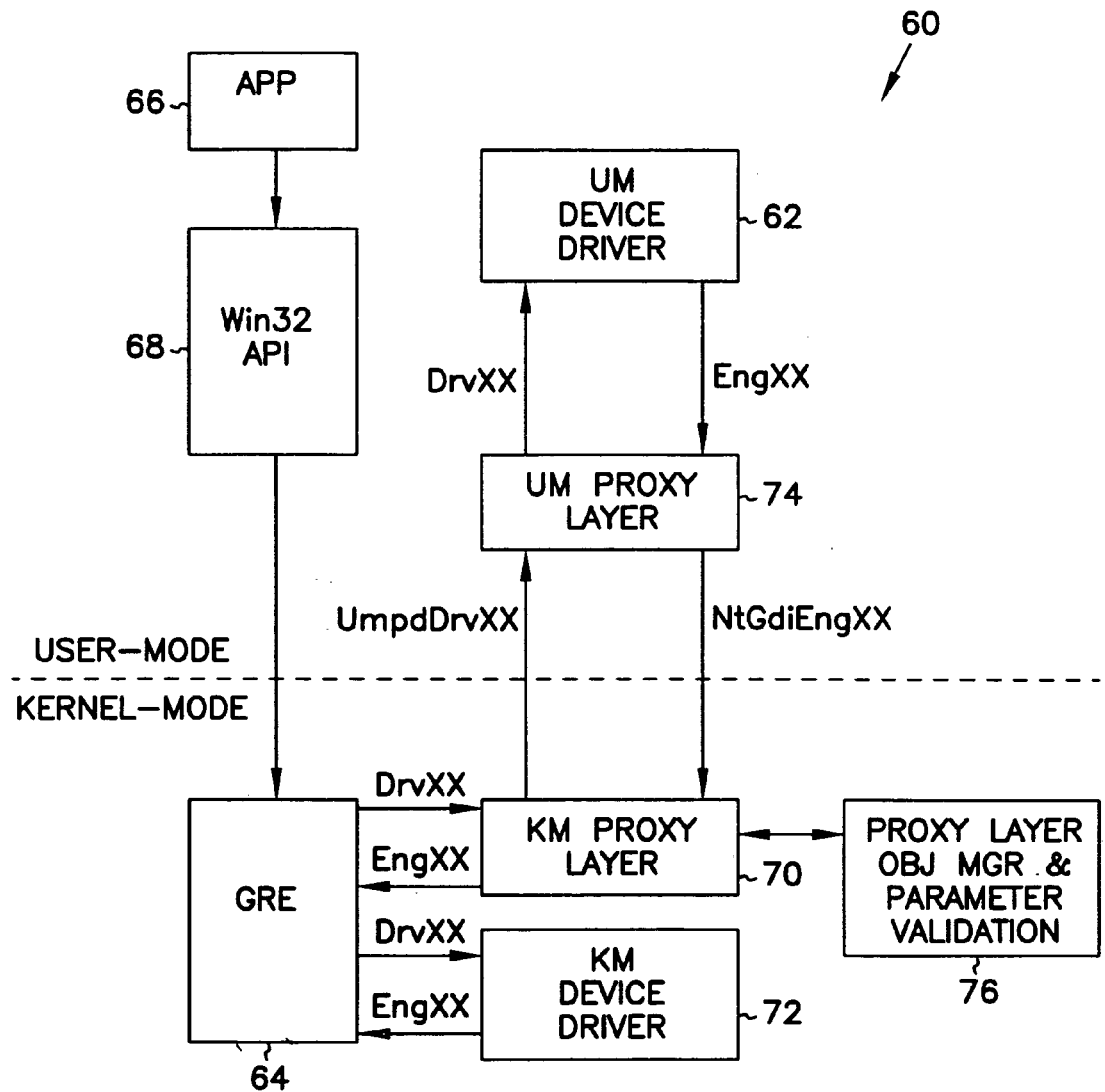
FIG. 2 illustrates a simplified block diagram of the architecture of an embodiment of the invention.

Referring now to FIG. 2, there is illustrated in a block diagram depicting the relationship between the major components, an example embodiment of the architecture 60 of a user mode device driver interface (UMDDI) according to the present invention, as implemented in Windows® NT® version 5.0 and similar systems. Although the example embodiment is described with specific reference to Windows® NT® version 5.0, it shall be understood that the invention is in no way limited to this environment, but is broadly applicable to any operating system or the like executing device drivers in kernel mode. The UMDDI allows the device driver 62 to execute in user-mode while the graphics engine (GRE) 64 remains in kernel-mode. As described in more detail below, the UMDDI exists as a layer between the user-mode driver 62 and GRE 64; from the perspective of GRE 64, it encapsulates the user-mode driver and makes it appear to be a normal kernel-mode driver. The UMDDI layer handles the kernel-to-user and user-to-kernel transitions, parameter validation, and management of the kernel-mode and user-mode data and objects.

The following description of the architecture of FIG. 2 is divided into the following topics: 1) GRE and kernel-mode device drivers; 2) GRE and the proxy layers; 3) the proxy layers and user-mode device drivers; 4) calls from GRE to user-mode device drivers (DrvXX calls); 5) calls from user-mode device drivers to (GRE EngXX calls); and 6) the proxy layer object manager.

GRE and Ordinary Kernel-Mode Device Drivers

In response to internal events or calls by an application 66 to the Win32 API 68, the GRE 64 calls the kernel-mode graphics driver 72 entry points (depicted in FIG. 2 as DrvXX for graphics operations and services. This call is made through a function table that is loaded during the kernel-mode graphics driver's 72 initialization. The function table contains pointers for each and every DrvXX function that the kernel-mode graphics driver 72 supports. A separate function table is maintained for every kernel-mode graphics driver 72 and is kept in a linked list managed in kernel-mode memory (depicted generally in FIG. 1).

While servicing a call to a DrvXX function, the kernel-mode graphics driver 72 may require additional information or services from the GRE 64. These services include calls for software-only execution of the graphics operation, management of resources (memory, semaphores, etc.), and management of GRE 64 objects (for example, fonts, transforms and clipping). These helper functions and callbacks are depicted in FIG. 2 as EngXX. To keep the diagram and discussion clearer the single label EngXX is used to represent callbacks both of the form EngXX and YYOBJ_XX (for example, the Windows® NT® EngCopyBits, and CLIPOBJ_bEnum).

GRE and the Proxy Layers

GRE 64 cannot call the user-mode graphics driver 62 DrvXX functions directly. Instead, it calls the Kernel-Mode Proxy Layer 70 (or simply the KM Proxy Layer 70), which encapsulates the user-mode graphics driver 62 and makes the driver appear to GRE 64 as if it were a normal kernel-mode graphics driver 72.

When GRE 64 initializes its function table for the user-mode graphics driver 62, it calls the KM Proxy Layer 70 to query the supported DrvXX functions as it would with any kernel-mode graphics driver 72. The proxy layers (70, 74) in turn can query the user-mode graphics driver 62 for its supported DrvXX functions. The User-Mode Proxy Layer 74 (or simply the UM Proxy Layer 74) maintains its own function table in user-mode memory (depicted generally in FIG. 1) for each of the user-mode graphics drivers 62. However, the entry points the KM proxy layer 70 provides to GRE 64 are actually stubs (depicted in FIG. 2 as UmpdDrvXX) that redirect function calls through the user-mode driver function table maintained by the UM proxy layer 74 in user-mode memory. Thus, for every DrvXX function supported by the user-mode graphics driver 62, the GRE 64 function table has a corresponding UmpdDrvXX function supplied by the proxy layer 70.

The Proxy Layers and User-Mode Device Drivers

As mentioned above, the UM proxy layer 74 maintains a function table in user-mode memory for every user-mode graphics driver 62. These function tables and other (the User-Mode Driver List). During initialization, this list can be searched by driver name. After initialization, the UM proxy layer 74 can more efficiently access the correct list entry via a DHPDEV (Device Handle for Physical Device) handle passed from GRE 64.

Other than the driver initialization entry points, all DrvXX driver entry points require a DHPDEV handle either explicitly as a parameter or as part of a data structure passed as a parameter. This DHPDEV handle is returned by the driver's entry point (referred to herein as DrvEnablePDEV; (one of the previously mentioned initialization entry points). Typically, a kernel-mode graphics driver 72 associates the DHPDEV with private driver instance data; this allows the private driver data to be accessed quickly since GRE 64 passes the DHPDEV into the DrvXX functions. For a user-mode graphics driver 62, rather than return the DHPDEV handle from the DrvEnablePDEV to GRE 64, the UM Proxy Layer 74 stores the original handle in the list entry and returns a proxy handle to the list entry to GRE 64. Thus the UM Proxy Layer 74 is able to quickly access the correct user-mode function table.

In addition, according to one embodiment, no kernel resources can be held when GRE 64 calls the user-mode graphics driver 62 (to ensure that a driver error cannot cause the system to wait indefinitely). In this embodiment, the KM Proxy Layer 70 releases and reacquires resources as necessary.

DrvXX Calls from GRE to User-Mode Device Driver

Figure 3:
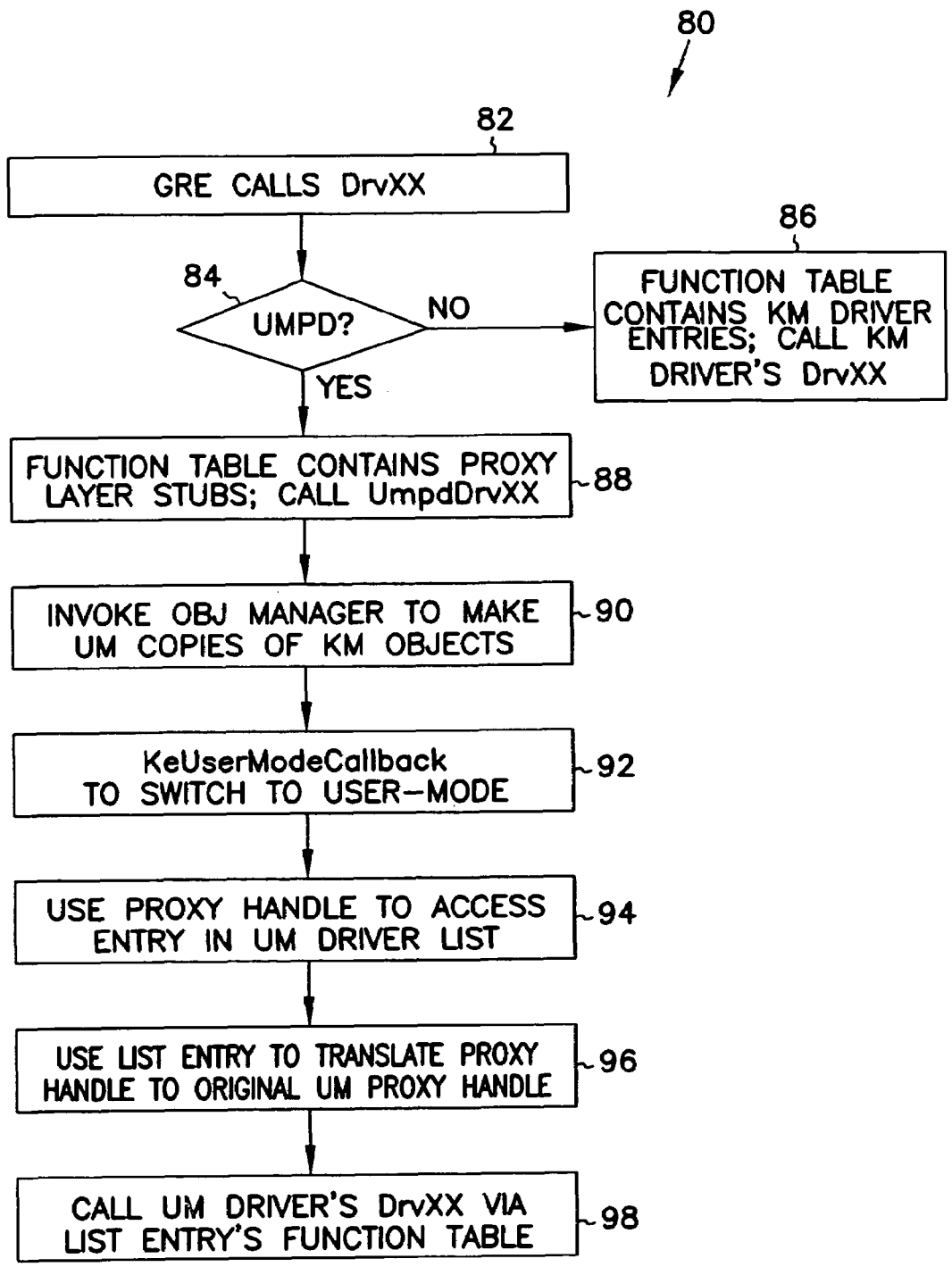
FIG. 3 is a flow chart of calls from the graphics engine (GRE) to a driver, according to one embodiment of the invention.

Referring now to FIG. 3, there is shown a block diagram 80 of the operation providing for DrvXX calls from GRE 64 to user-mode device driver 62 (82). If the driver 62 that GRE 64 calls (84) is a user-mode graphics driver 62, then the function table that GRE 64 references contains pointers to KM Proxy Layer 70 stubs (88). Therefore, invocation of a DrvXX function via GRE 64's kernel-mode function table actually calls the corresponding UmpdDrvXX stub. Otherwise, the function table contains KM driver 72 entries, and the GRE 64 calls the KM driver's DrvXX (86).

Since the user-mode graphics driver 62 cannot access kernel-mode memory, the UmpdDrvXX stub must use the Proxy Layer Object Manager 76 to make user-mode for details) (90). These user-mode objects are substituted for the kernel-mode versions and passed to the user-mode device driver 62.

The Windows® NT® KeUserModeCallback system call is used to make the transition from the kernel-mode proxy layer 70 to the user-mode proxy layer 74 (92). In the user-mode proxy layer 74, the DHPDEV (proxy) handle is used to find the correct list entry in the User-Mode Driver List (94). The User-Mode Driver List includes not only the user-mode graphics driver's function table, but also the original user-mode DHPDEV handle cached by the UM Proxy Layer 74 during initialization (96). The UTM Proxy Layer 74 replaces the proxy handle with the original DHPDEV handle and calls the user-mode driver's DrvXX entry point via the function table (98).

EngXX Calls from User-Mode Device Driver to GRE

Figure 4:
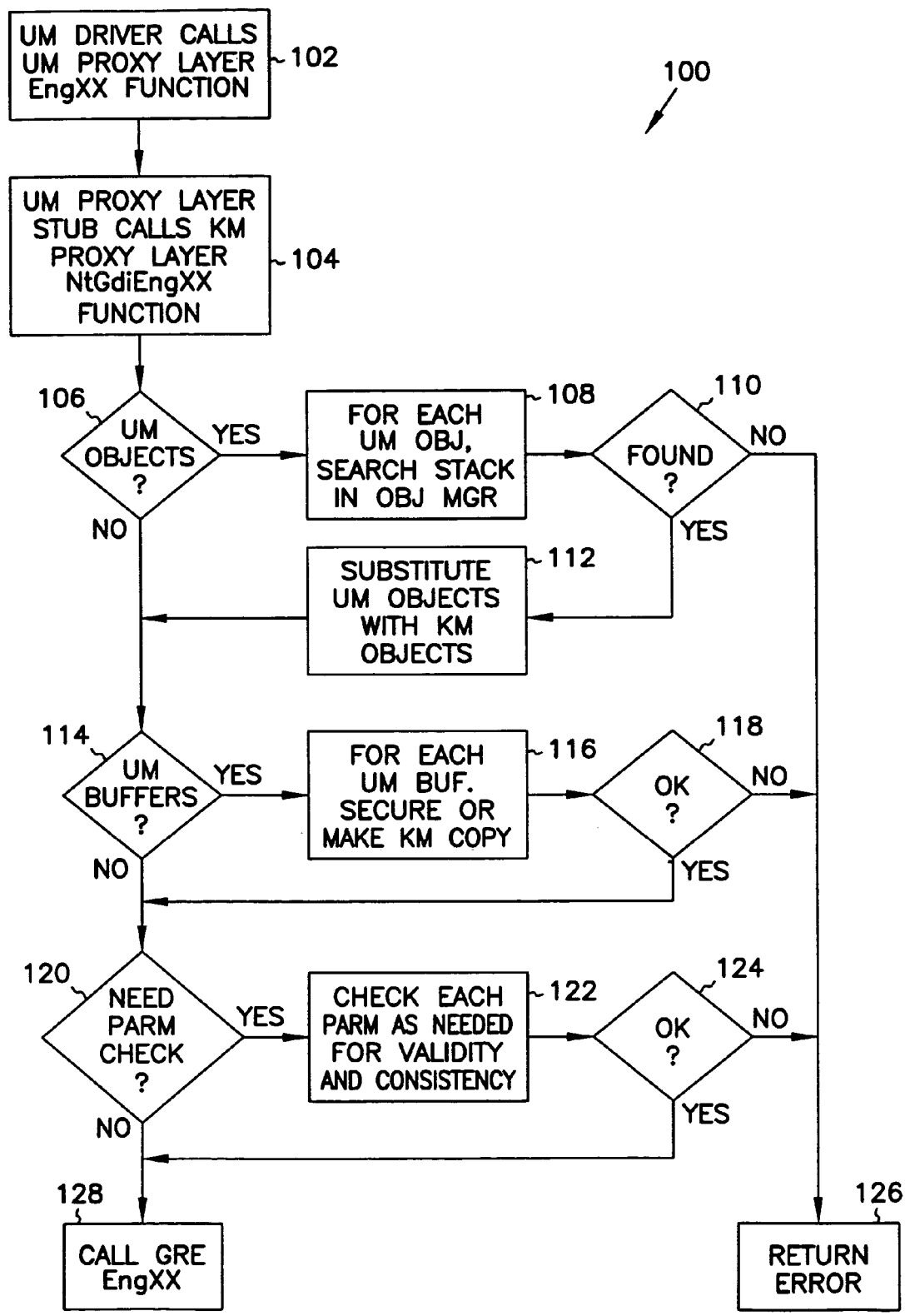
FIG. 4 is a flow chart of calls from a user-mode driver to GRE.

Referring now to FIG. 4, there is illustrated a block diagram 100 of the operation of EngXX calls from user-mode device driver to GRE 64 (102). When a user-mode graphics driver 62 calls back via an EngXX function, the call is serviced by a user-mode EngXX stub in the UM Proxy Layer 74, which in turn calls kernel-mode via the corresponding call (depicted as NtGdiEngXX) in FIG. 2) provided by the KM Proxy Layer 70 (104).

If any user-mode GRE 64 objects were passed from user-mode (106), the KM Proxy Layer 70 invokes the Proxy Layer Object Manager 76 to find and substitute the original kernel-mode GRE 64 object (108-112). In addition, for any user-mode memory buffers that are passed (114), the Proxy Layer Object Manager 76 either secures it or makes a kernel-mode copy (116). Finally, it performs parameter checking such as checking for illegal, out-of-range, or inconsistent values (120-122). After the Proxy Layer Object Manager 76 has finished these tasks, the KM Proxy Layer 70 calls the kernel-mode EngXX function in GRE 64 (128). If there are any errors, they are returned (110, 118, 124, 126).

The Proxy Layer Object Manager

The Proxy Layer Object Manager is responsible for tracking kernel-mode GRE 64 kernel-mode GRE 64 objects, securing or copying user-mode memory buffers passed by the user-mode graphics driver to GRE, and parameter validation.

Since the user-mode graphics driver 62 is not able to access kernel-mode memory, it is necessary to make user-mode accessible copies of kernel-mode memory when calling through the proxy layers (70, 74) to the user-mode driver 62. The Proxy Layer Object Manager 76 allocates and secures user-mode memory to hold copies of kernel-mode GRE 64 objects. The memory is kept secured to prevent a defective driver or application from crashing the kernel (which will crash the entire OS). Pointers to both the-user-mode copy and the original kernel-mode object are saved on a stack in a per-thread data structure. The stack structure is necessary since the UMDDI must allow nesting of DrvXX and EngXX calls (i.e., DrvXX may call EngYY which may call DrvZZ, etc.).

When the user-mode graphics driver 62 calls back through the proxy layers (70, 74) via an EngXX, the Proxy Layer Object Manager 76 searches the stack in the per-thread data structure for the user-mode copy and retrieves a pointer to the original kernel-mode GRE 64 object. This is necessary because the kernel-mode EngXX function must execute using the kernel-mode version of the object.

In addition to converting user-mode objects to kernel-mode objects for EngXX calls, the Proxy Layer Object Manager 76 must also validate any other user-mode memory buffers passed by the user-mode graphics driver 62 via EngXX. User-mode memory must be secured or a kernel-mode copy must be made to prevent a defective driver 62 or application 66 from crashing the kernel. The Proxy Layer Object Manager 76 also performs checking for invalid, out-of-range, or inconsistent parameter values as needed.

Furthermore, the Proxy Layer Object Manager 76 will delete any kernel-mode objects allocated by the user-mode graphics driver 62 when the application 66 process terminates.

For performance reasons, large objects that are passed to user-mode graphics drivers 62 are allocated by GRE 64 from user-mode memory rather than kernel-mode memory (thus avoiding the allocation and copying overhead in the Proxy Layer Object bitmap memory from user-mode when invoked by user-mode graphics drivers 62. As another example, compatible bitmaps created by an application 66 via the Windows® NT® CreateCompatibleBitmap are allocated from user-mode memory if the target device is a user-mode graphics driver 62. For the same reason, all the large temporary buffers used by the Windows® NT® Win32k subsystem are allocated in user mode memory when dealing with user mode printer drivers.

In an embodiment of the invention as used in Windows® NT® version 5.0, the invention is used to support user-mode graphics drivers for printers. According this embodiment, some Windows® NT® callbacks are not used and therefore need not be supported, such as EngCreatePath, EngCreateClip, EngDeleteClip, EngGetType1FontList, EngDebugBreak. Also, some of the callbacks have user-mode equivalents, but are provided to simplify porting or translating of the kernel-mode driver source code to user-mode. However, it shall be understood that the invention is in no way limited to any particular DDI calls. In addition, according to the Windows NT version 5.0 embodiment herein described, a user mode graphics driver for printers must support the DrvQueryDriverInfo function to identify itself as a user-mode graphics driver.

Conclusion

Thus, as described above, the UMDDI allows the graphics device driver to execute in user-mode, providing that all of the previously listed restrictions and limitations of kernel-mode execution are removed. More specifically, the stack space is no longer restricted to 8 Kbytes. The driver may use the superior floating-point capabilities on x86 processors; the driver may utilize native floating-point operations as well as NTDDI floating-point support functions. The driver may call any of the Windows® NT® Win32 API for system services including memory management, synchronization, file i/o, etc. The driver may call other user-mode components or drivers. The operating system is protected against driver errors, resulting in a more robust environment. Resources are allocated from user-mode and therefore consume resources from the application, not the kernel. Also, these resources are automatically freed by the operating system when the application process terminates. Further, the driver programmer may choose from a richer set of user-mode debugging tools.

While the embodiments of the invention have been described with specific focus on their embodiment in an operating system, the invention as described above is also embodied in a computer system including both a computer and software, in various forms as a computer program encoded in a machine readable article of manufacture, and in various forms as methods for controlling the operation of a computer system, wherein the methods are carried out for example by the software described above. Further, it shall be recognized that all or a portion of the various software components described above may be interchanged with hard-wired components providing substitute functionality.

The invention claimed is:

1. A method for operating a computer system comprising:
   executing a device driver in a user mode of operation, wherein the device driver initiates a function call comprising code executable in user mode, wherein the device driver comprises device driver code executable in kernel mode; and
   receiving the function call at an interface, wherein the interface translates the function call to code executable in kernel mode, wherein the interface comprises a kernel mode proxy module linked to a user mode proxy module, wherein the interface provides copies of kernel mode objects to the user mode for use in executing user mode functions, wherein the interface provides copies of user mode objects to the kernel mode for use in executing kernel mode functions.

2. The method of claim 1, wherein the device driver appears to operate as if it were a kernel mode driver.

3. An article of manufacture comprising a computer readable storage medium encoded with an interface computer program executable on a suitably configured computer to provide communications between kernel mode of an operating system and a user mode device driver executing in a user mode of the operation system, wherein the device driver comprises device driver code, and wherein the device driver code can be translated so that it is executable in both kernel mode and user mode, wherein the interface program comprises a kernel mode proxy module linked to a user mode proxy module, wherein the interface provides copies of kernel mode objects to the user mode for use in executing user mode functions, wherein the interface provides copies of user mode objects to the kernel mode for use in executing kernel mode functions.

4. A computer program encoded in a machine readable storage medium and including a first object executable in a kernel mode of an operating system, a second object executable in a user mode of the operating system, and an interface program executable in both the kernel mode and the user mode, the interface program coupled between the first and second objects for communication between the kernel mode and user mode, wherein the interface is configured to translate code of the second object so that it is executable in both kernel mode and user mode, wherein the interface program comprises a kernel mode proxy module linked to a user mode proxy module, wherein the interface program provides copies of kernel mode objects to the user mode for use in executing user mode functions, wherein the interface program provides copies of user mode objects to the kernel mode for use in executing kernel mode functions.

5. A method for operating a computer system comprising:
   executing a device driver in a user mode of operation; and
   executing an interface program to translate device driver communications to and from kernel mode via a linked user mode proxy and a kernel mode proxy;
   receiving the function call at the interface, wherein the interface program provides copies of kernel mode objects to the user mode for use in executing user mode functions, wherein the interface program provides copies of user mode objects to the kernel mode for use in executing kernel mode functions.

6. An article of manufacture comprising a computer readable storage medium encoded with an interface computer program executable on a suitably configured computer to provide communications between a kernel mode of an operating system and a user mode device driver executing in a user mode of the operating system, wherein the communications between the kernel mode and the user mode driver employ a linked user mode proxy module and a kernel mode proxy module, wherein an interface provides copies of kernel mode objects to the user mode for use in executing user mode functions, wherein the interface provides copies of user mode objects to the user mode for use in executing kernel mode functions.

7. A computer program encoded in a machine readable storage medium and including a first object executable in kernel mode of the operating system, a second object executable in a user mode of the operating system, and an interface program executable in both the kernel mode and the user mode, the interface program coupled between the first and second objects for communications between the kernel mode and user mode, wherein the interface program comprises a kernel mode proxy module linked to a user mode proxy module, wherein the interface program provides copies of kernel mode objects to the kernel mode for use in executing user mode functions, wherein the interface program provides copies of user mode objects to the user mode for use in executing kernel mode functions.

* * * * *